US006570929B1

(12) United States Patent
Eriksson

(10) Patent No.: US 6,570,929 B1
(45) Date of Patent: May 27, 2003

(54) POWER CONTROL SCHEME FOR MAXIMIZING CARRIER SIGNAL-TO-NOISE RATIO IN MULTICARRIER TRANSMITTERS

(75) Inventor: Patrik Eriksson, Bro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/349,717

(22) Filed: Jul. 8, 1999

(51) Int. Cl.[7] ............... H04L 27/28; H04B 1/04; H04B 1/05; H03F 3/45
(52) U.S. Cl. ............... 375/260; 455/127; 455/232.1; 330/254
(58) Field of Search ............... 375/260, 295, 375/345; 455/127, 522, 103, 232.1, 234.1, 245.1, 250.1; 330/254, 278, 129, 130

(56) References Cited

U.S. PATENT DOCUMENTS

| 5,384,547 | A |   | 1/1995  | Lynk, Jr. et al. ......... 330/136 |
| 5,528,199 | A | * | 6/1996  | Dunlop et al. ............ 331/17 |
| 5,808,575 | A | * | 9/1998  | Himeno et al. ............ 341/139 |
| 5,894,498 | A |   | 4/1999  | Kotzin et al. ............ 375/295 |
| 5,987,307 | A | * | 11/1999 | Buskirk et al. ............ 375/219 |
| 6,256,502 | B1| * | 7/2001  | Santa et al. ............ 370/335 |

FOREIGN PATENT DOCUMENTS

| EP | 0719001 A1 | 6/1996  |
| EP | 0762661 A2 | 3/1997  |
| GB | 2300546 A  | 11/1996 |

OTHER PUBLICATIONS

European Search Report, dated Mar. 13, 2000.
D. Wulich, "Peak Factor In Orthogonal Multicarrier Modulation With Variable Levels", Electronics Letters, GB, IEE Stevenage, vol. 32, No. 20, Sep. 26, 1996, pp. 1859–1861.
U.S. Patent Application No. 09/360,141, by Magnus Frodigh et al., field Jul. 26, 1999.

* cited by examiner

Primary Examiner—Chi Pham
Assistant Examiner—Khai Tran

(57) ABSTRACT

A method and apparatus for maximizing the signal-to-noise ratio of an output signal from a digital-to-analog converter. In a multicarrier transmitter the power of a plurality of modulated digital data streams are individually adjusted so that the peak power of the sum of the signals of the modulated data streams is equal to a full scale level of a digital-to-analog converter. The power adjusted signals are upconverted to their respective carrier frequencies and combined into a single digital data stream by an adder. The single digital data stream is converted into an analog data stream by the digital-to-analog converter. The power of the analog data stream is adjusted so that the power of each carrier frequency is at a level which provides a corresponding mobile station with a signal of acceptable quality.

17 Claims, 6 Drawing Sheets

POWER CONTROL SCHEME FOR MAXIMIZING CARRIER SIGNAL-TO-NOISE RATIO IN MULTICARRIER TRANSMITTERS

FIELD OF INVENTION

The present invention relates to the field of radio telecommunications, including cellular telecommunications, and more specifically, to maximizing the signal-to-noise ratio in multicarrier transmitters by controlling the power level of each of the carriers entering a digital-to-analog converter and by controlling overall power gain of the analog portion of the transmitter.

BACKGROUND OF THE INVENTION

In conventional cellular systems, a base station is allocated a predetermined number of frequency channels for communication with mobile stations. In the base station a separate transmitter is employed for each frequency channel. However, the use of separate transmitters for each frequency channel results in a duplication of parts and an increase in cost due to the additional hardware required. Thereafter, it was realized that the hardware cost per channel could be reduced by using multicarrier transmitters in place of the plurality of single carrier transmitters to transmit a plurality of frequency channels. Since multicarrier transmitters transmit over a broad range of frequencies, they are also sometimes referred to in the art as wideband transmitters. However, for ease of discussion, the transmitters will be referred to herein as multicarrier transmitters.

FIG. 1 illustrates a conventional multicarrier transmitter 100 which might be used to transmit multiple frequency channels from a base station in a radiocommunication system. The conventional multicarrier transmitter 100 operates as follows. A number N of baseband frequency data signals $BB_1 \ldots BB_N$ are modulated by modulators $Mod_1 \ldots Mod_N$, respectively, where the bits associated with each data signal are symbol encoded for transmission, i.e., the modulator generates the corresponding baseband waveform. Each of the modulated data signals is forwarded to a corresponding digital power control module $DPC_1 \ldots DPC_N$, where each DPC adjusts the signal power level of the corresponding modulated data signal based on the commands provided by the Radio Control Unit 150. More specifically, the power level of each modulated data signal is adjusted such that the absolute power level of each carrier $P_{k,out}$ at the transmitter is equal to the amount of power required for the carrier to reach a particular mobile station which is to receive the carrier, where k varies from 1 to N and identifies the corresponding baseband frequency data signals $BB_1 \ldots BB_N$.

The modulated data signals are then forwarded from the digital power control modules $DPC_1 \ldots DPC_1$ N to multipliers $Mult_1 \ldots Mult_N$, respectively, where each modulated data signal is upconverted to a corresponding carrier frequency. The upconverted signals are then summed by adder 110. The compound signal produced by adder 110 is then forwarded to the digital-to-analog converter (DAC) 120. The resulting compound analog signal is then passed from DAC 120 through an analog transmitter chain which includes analog amplifier 160, upconverter (not shown), and filters (not shown). Analog amplifier 160 then amplifies the compound signal by a fixed gain $G_i$. For ease of discussion $G_i$ has been described as the gain of analog amplifier 160, however, one skilled in the art will recognize that $G_i$ represents the total gain of the analog section of the transmitter, including losses due to filters and upconverters. A more detailed discussion of multicarrier transmitters can be found in "Base-Station Technology Takes Software-Definable Approach" by Richard M. Lober, Wireless System Designs, February 1998, which is herein incorporated by reference.

Multicarrier transmitters are designed to handle a maximum number of simultaneous carriers N. In designing a multicarrier transmitter, care must be taken to ensure that the instantaneous in-phase sum, $P_{sum}$, of the N carriers does not exceed the full scale range of the DAC, i.e., the value associated with the greatest digital code that can be converted into an analog value. $P_{sum}$ can be calculated using equation (1) below, where $C_N$ represents the power of a specific user, N, in a specific time slot on a specific carrier frequency. Normally, $C_N$ is equal to the peak power within the specific time slot.

$$(\sqrt{C_1}+\sqrt{C_2}+ \ldots +\sqrt{C_N})^2 = P_{SUM} \tag{1}$$

If the instantaneous sum of the N carriers exceeds the full scale range of the DAC, the DAC will clip the analog signal, i.e., prevent the analog signal from exceeding the amplitude corresponding to the full scale range of the DAC, which will affect the quality of the transmitted signal. However, one skilled in the art will recognize that in practical applications, a system might tolerate a power level which exceeds the DAC's full scale range by a small amount for short periods of time without suffering a decrease in system performance.

In a multicarrier transmitter with N carriers, the above-mentioned "clipping" of the analog signal can be avoided by setting the full scale range of the DAC to $20*\log(N)$ dB above the maximum allowed peak power level of any individual carrier $1 \ldots N$, since the full scale range set $20*\log(N)$ dB above the maximum power level of any individual carrier represents the greatest power level attainable by the sum of the N carriers.

In FIG. 2, the maximum power level associated with each of the N carriers, during a given time slot in a TDMA based system, is $C_{max}$. Accordingly, the full scale range of the DAC is set to $20*\log(N)$ dB above $C_{max}$. When the output noise of the DAC is dominated by quantization noise, the DAC noise floor level relative to the DAC full scale range, is constant for a given DAC resolution and sampling frequency. If all carriers are operating at maximum power, the signal-to-noise ratio for each individual carrier is at its greatest level.

Unlike FIG. 2, FIG. 3 illustrates a time slot where the N carriers have different power levels and not all of the N carriers are active. Assuming the DAC full scale range in FIG. 3 is the same as the DAC full scale range in FIG. 2, the noise floor levels of FIGS. 2 and 3 will also be the same. Since the power levels of the N carriers in FIG. 3 are less than the power levels of the N carriers in FIG. 2, while the noise floor level in FIGS. 2 and 3 is the same, the signal-to-noise ratio for each of the individual carriers in FIG. 3 will be lower than for the corresponding individual carriers in FIG. 2.

Accordingly, it would be desirable to maximize the signal-to-noise ratio for each carrier and time slot. Further, it would be desirable to maximize the signal-to-noise ratio for each individual carrier in a multicarrier transmitter when less than the maximum number of carriers are used and/or when not all carriers are operating at the maximum power level. In addition, it would be desirable to maximize the signal-to-noise ratio of each individual carrier in the multicarrier transmitter without the instantaneous sum of all the carriers exceeding the DAC's full scale range.

SUMMARY OF THE INVENTION

The power level of individual carriers is adjusted in the digital domain, by a command from a radio control unit, such that $P_{sum}$ is equal to the full scale range of the DAC, or such that $P_{sum}$ exceeds the full scale range of the DAC, though not enough to cause intolerable distortion to the signal. The radio control unit also commands an analog power control module to adjust the power level of all carriers simultaneously such that the transmitted actual absolute output power level of each carrier is set to the correct level for a corresponding mobile station to receive an acceptable signal.

It is an object of the present invention to improve the signal-to-noise ratio of a multicarrier signal which passes through a DAC.

It is also an object of the present invention to maximize the utilization of a DAC in a multicarrier transmitter system, thereby reducing the implementation cost of the transmitter chain in a radio base station.

It is a further object of the present invention to maximize the signal-to-noise ratio of each individual carrier in a multicarrier transmitter, thereby improving end user quality of service for all users.

BRIEF DESCRIPTION OF THE DRAWINGS

The present invention will now be described with reference to the accompanying drawings in which.

DETAILED DESCRIPTION OF THE INVENTION

In the following description, for purposes of explanation and not limitation, specific details are set forth, such as particular circuits, circuit components, and techniques, in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed over a number of time slots. However, those skilled in the art will appreciate that the concepts disclosed herein find use in other access methods, including, but not limited to, frequency division multiple access (FDMA), code division multiple access (CDMA), or some hybrid of any of the above protocols. Likewise, some of the exemplary embodiments provide illustrative examples relating to the GSM system, however, the techniques described herein are equally applicable to radio base stations in any system.

Figure 1:
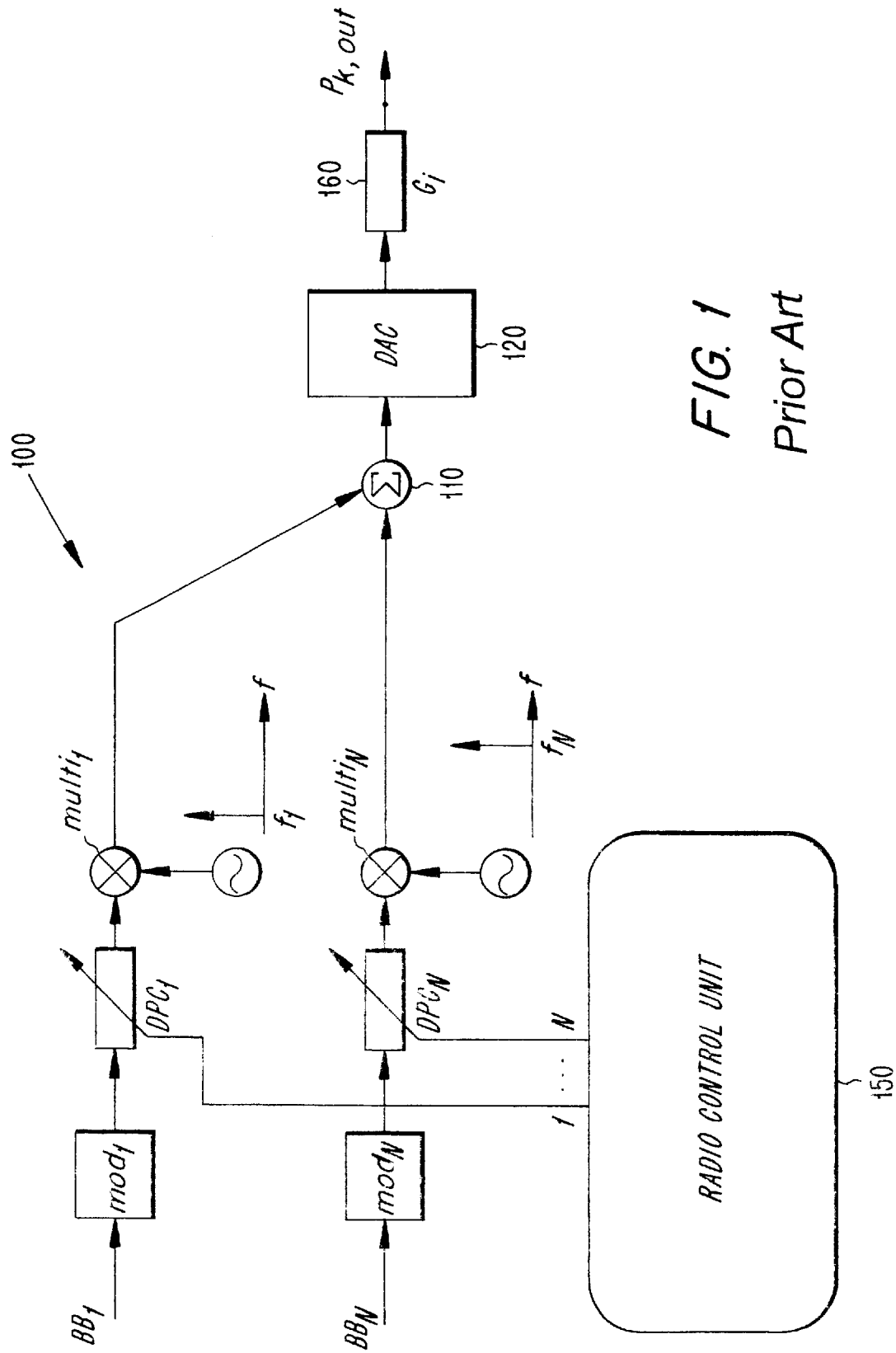
FIG. 1 illustrates a conventional multicarrier transmitter.
Figure 2:
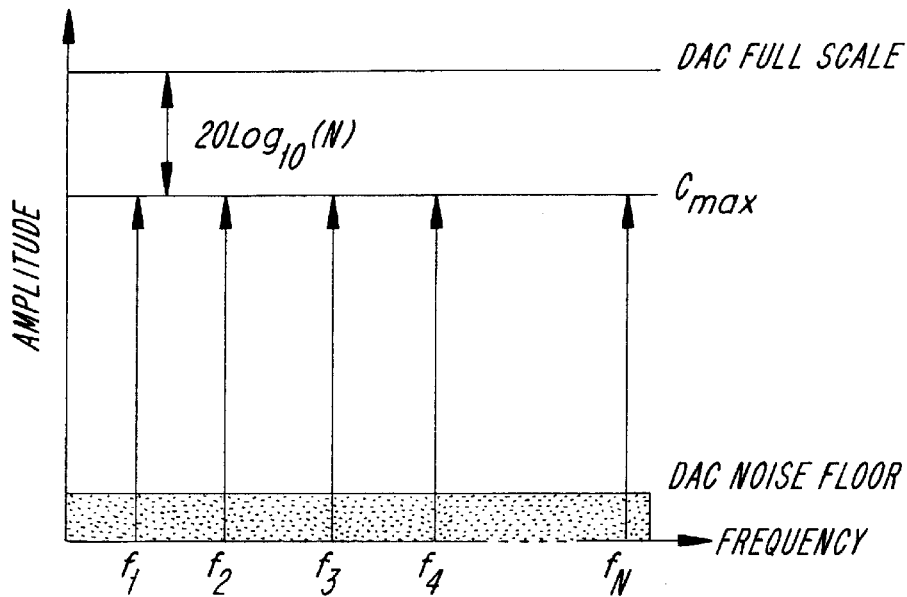
FIG. 2 illustrates N carriers in one time slot at the maximum power level.
Figure 3:
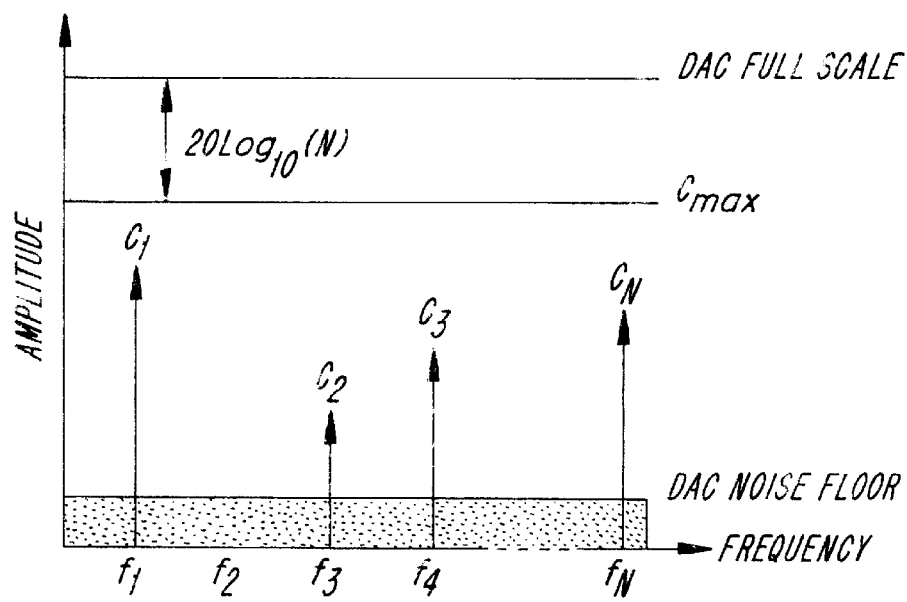
FIG. 3 illustrates a time slot where the N carriers are at different power levels and not all N carriers are active.
Figure 4:
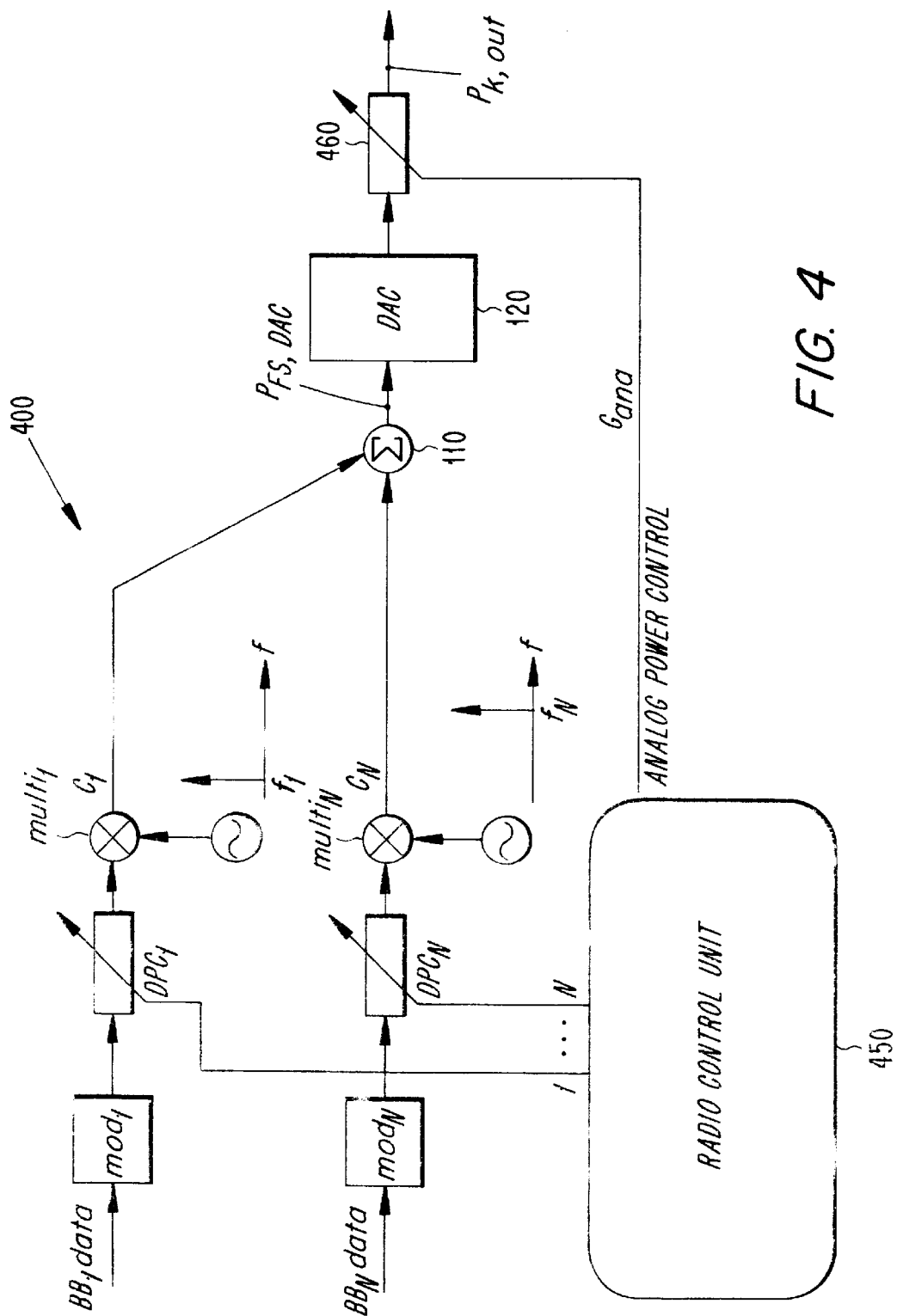
FIG. 4 illustrates an exemplary multicarrier transmitter for maximizing the signal-to-noise ratio.

FIG. 4 illustrates a multicarrier transmitter 400 according to exemplary embodiments of the present invention. Similar to multicarrier transmitter 100 of FIG. 1, each of a number of N baseband frequency data signals $BB_1 \ldots BB_N$ are forwarded to a corresponding modulator $Mod_1 \ldots Mod_N$. The modulated baseband signals $BB_1 \ldots BB_N$ are then forwarded to the digital power control modules $DPC_1 \ldots DPC_N$. The Radio Control Unit 450 individually sets the gain of each digital power control module $DPC_1 \ldots DPC_N$, such that $P_{sum}$ is equal to the full scale range of the DAC 120, $P_{FS,DAC}$.

The signals generated by the digital power control modules $DPC_1 \ldots DPC_N$ are forwarded to multipliers $Multi_1 \ldots Multi_N$ where the signals are upconverted to a corresponding carrier frequency. The upconverted signals are then summed by adder 110. The resultant compound signal is converted from digital to analog by DAC 120. The analog signal is forwarded to an analog power control module 460 which is controlled by an analog power control table stored in the Radio Control Unit 450. Although analog power control module 460 is illustrated as a single element in FIG. 4, the functionality of the analog power control module 460 may be distributed over the analog transmitter chain, i.e., amplifiers, filters and upconverters, in order to minimize the effect on the noise figure.

In order to correctly adjust the absolute power level at the transmitter, $P_{k,out}$, for the carrier signals, the power level of the carrier signals are all adjusted by the same amount by the analog power control module 460. In order to adjust the gain of each digital power control module and the gain of the analog power control module 460, the Radio Control Unit 450 knows the required power level of each carrier at the output of the transmitter $P_{k,out}$, i.e., the amount of transmit power required to provide a corresponding mobile station with an acceptable signal. Since the full scale range of the DAC is determined at the time of installation of the DAC in the multicarrier transmitter, the full scale range $P_{FS,DAC}$ of the DAC 120 and the corresponding code can be programmed into the Radio Control Unit 450.

Figure 5:
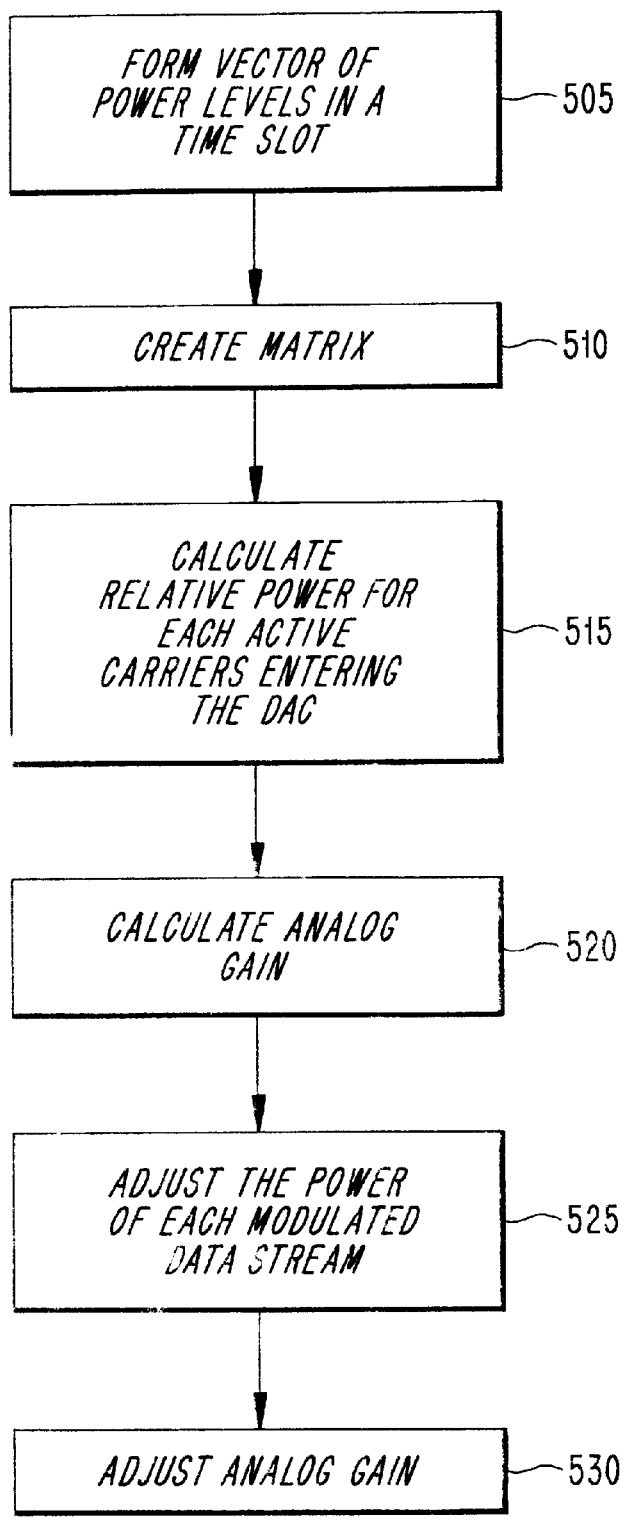
FIG. 5 illustrates an exemplary method for power control.

FIG. 5 is a flow chart illustrating an exemplary method for maximizing the signal-to-noise ratio of each carrier using the multicarrier transmitter illustrated in FIG. 4. Accordingly, in step 505, a vector is formed using the output power levels associated with each carrier in a given time slot, e.g., $P=[P_{1,out} P_{2,out} P_{3,out} \ldots P_{N,out}]$. In step 510, using vector P, a matrix M is created where the elements are the ratios of all actual absolute power levels for the time slot.

$$M = \begin{bmatrix} P_1/P_1 & P_1/P_2 & P_1/P_3 & \ldots & P_1/P_N \\ P_2/P_1 & P_2/P_2 & P_2/P_3 & \ldots & P_2/P_N \\ P_3/P_1 & P_3/P_2 & P_3/P_3 & \ldots & P_3/P_N \\ \ldots & \ldots & \ldots & \ldots & \ldots \\ P_N/P_1 & P_N/P_2 & P_N/P_3 & \ldots & P_N/P_N \end{bmatrix}$$

$$= \begin{bmatrix} m_{11} & 1/m_{21} & 1/m_{31} & \ldots & 1/m_{NI} \\ m_{21} & m_{22} & 1/m_{32} & \ldots & 1/m_{N2} \\ m_{31} & m_{32} & m_{33} & \ldots & 1/m_{N3} \\ \ldots & \ldots & \ldots & \ldots & \ldots \\ m_{NI} & m_{N2} & m_{N3} & \ldots & m_{N4} \end{bmatrix}$$

If a carrier is not active then its power level will be zero. In order to avoid problems caused by a division by zero, all elements in both the row and column corresponding to non-active carriers are set to zero. e.g., if carrier 2 is not active ($P_{2,out}=0$) then both the second row and the second column of the matrix are set to zero.

In step 515, the power levels $C_1 \ldots C_N$ associated with the active carriers are calculated. The power levels $C_1 \ldots C_N$ correspond to the power levels of the respective carriers at the DAC input. Given the number of carriers possible and the power requirements of the carriers and assuming that the DAC full scale range cannot be exceeded, the largest signal-to-noise ratio for each carrier and the sum of the carriers occurs when $P_{sum}$ equals the DAC full scale range, as illustrated in equation (3) below.

$$P_{FS,DAC} = (\sqrt{C_1} + \sqrt{C_2} + \ldots + \sqrt{C_N})^2 = P_{sum} \quad (3)$$

Rearranging equation (3) above, each carrier power level $C_1 \ldots C_N$ can be calculated using the following equations, wherein only active carriers are calculated in order to avoid division by zero:

$$C_1 = \frac{P_{FS,DAC}}{\left(\sqrt{m_{11}} + \sqrt{m_{21}} + \ldots + \sqrt{m_{N1}}\right)^2} \quad (4\text{-}1)$$

$$C_2 = \frac{P_{FS,DAC}}{\left(\sqrt{m_{12}} + \sqrt{m_{22}} + \ldots + \sqrt{m_{N2}}\right)^2} \quad (4\text{-}2)$$

$$C_N = \frac{P_{FS,DAC}}{\left(\sqrt{m_{1N}} + \sqrt{m_{2N}} + \ldots + \sqrt{m_{NN}}\right)^2} \quad (4\text{-}3)$$

In step 520 the Radio Control Unit 450 determines the amount of gain required of the analog power control module 460 to adjust the power level of the individual carriers in the analog domain so that the absolute output power of the carriers is $P_{k,out}$, where k represents carriers $1 \ldots N$. Accordingly, the analog gain is calculated in step 520 in accordance with equation (5) shown below, where the analog gain of the analog power control module 460 is $G_{ana}$, $P_{k,out}$ is the required absolute output power of a particular carrier, $C_k$ is the power level of the corresponding carrier in the digital domain, and where $G_{ana}$, $P_{k,out}$ and $C_k$ are in decibels. For simplicity of description, $G_{ana}$ has been described as the gain of power control module 460. However, one skilled in the art will recognize that $G_{ana}$ can represent the total gain in the power control transmitter including the gain in the amplifier and any diminution of power caused by filters and upconverters in the analog section of the transmitter.

$$G_{ana} = P_{k,out} - C_k \quad (5)$$

In step 525 the power level of each individual carrier is adjusted. Further in accordance with step 525 and as illustrated in FIG. 4, once $C_1 \ldots C_N$ have been calculated using equations (4-1) through (4-3) above, the Radio Control Unit 450 sets the gain of $DPC_1 \ldots DPC_N$ so that the output of multipliers $Multi_1 \ldots Multi_N$ have a power level equal to $C_1 \ldots C_N$. According to equation (3), the in-phase sum of the carrier power levels $C_1 \ldots C_N$ will be equal to the DAC full scale level $P_{FS,DAC}$. In step 530 the analog power level of a particular carrier $P_{k,out}$ is adjusted using the calculated analog gain $G_{ana}$. Although steps 525 and 530 in FIG. 5 are illustrated as occurring sequentially in time, one skilled in the art will recognize that steps 525 and 530 can occur simultaneously.

Figure 6:
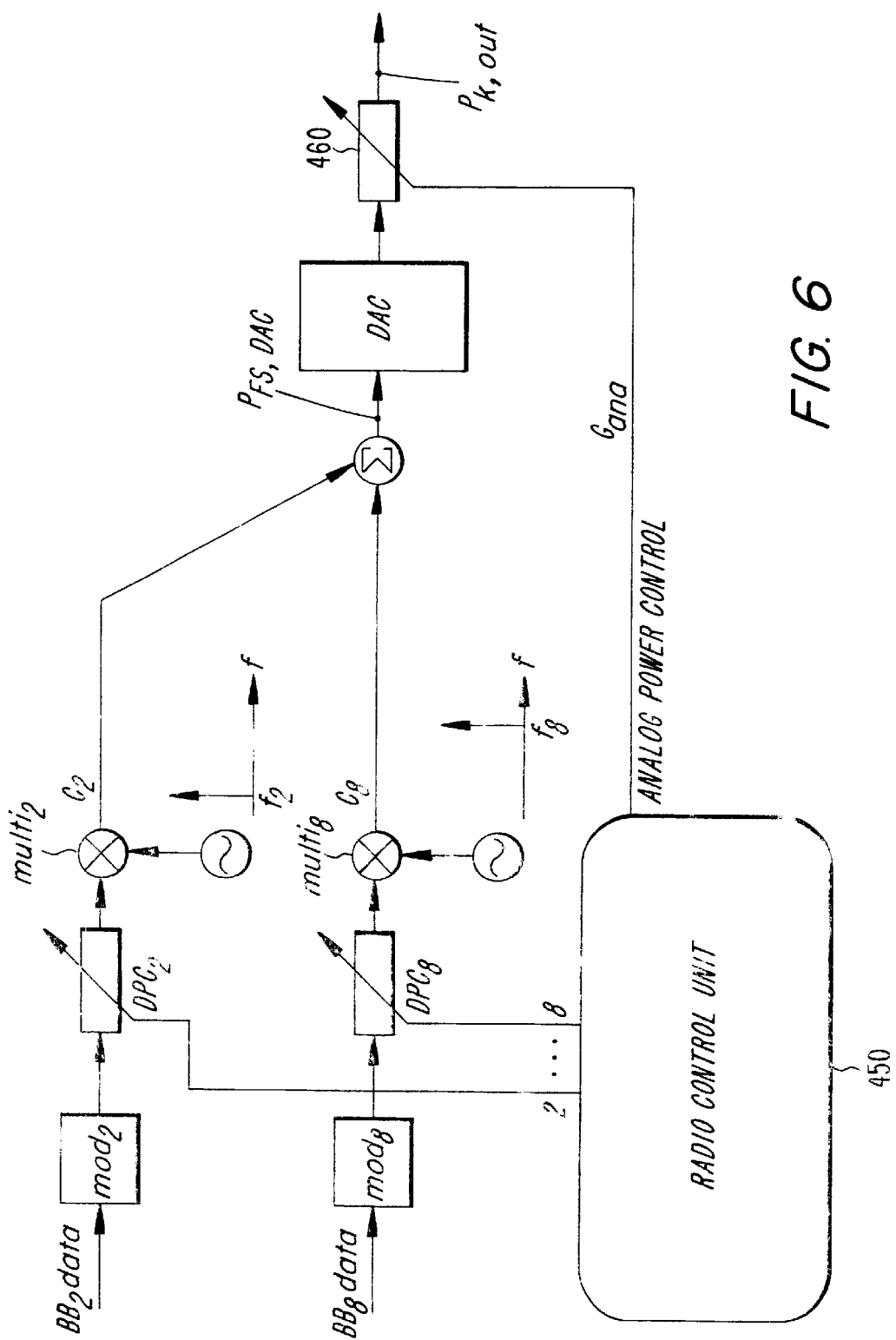
FIG. 6 illustrates power control of a multicarrier transmitter according to an exemplary embodiment of the present invention.

FIG. 6 illustrates an exemplary multicarrier transmitter where two of the eight carriers are active; the full scale output power of the DAC is 1 milliwatt; the output power of carrier $f_2$ is 1 Watt; and the output power of carrier $f_8$ is 0.1 Watts. In accordance with step 505, the output power vector is P=[0 1 0 0 0 0 0 0.1]. Using the output power vector, the matrix M created according to step 510 becomes:

$$M = \begin{bmatrix} 0 & 0 & 0 & \ldots & 0 \\ 0 & 1 & 0 & \ldots & 10 \\ 0 & 0 & 0 & \ldots & 0 \\ \ldots & \ldots & \ldots & & \ldots \\ 0 & 10^{-1} & 0 & \ldots & 1 \end{bmatrix}$$

$$= \begin{bmatrix} m_{11} & 1/m_{21} & 1/m_{31} & \ldots & 1/m_{81} \\ m_{21} & m_{22} & 1/m_{32} & \ldots & 1/m_{82} \\ m_{31} & m_{32} & m_{33} & \ldots & 1/m_{83} \\ \ldots & \ldots & \ldots & \ldots & \ldots \\ m_{81} & m_{82} & m_{83} & \ldots & m_{88} \end{bmatrix}$$

Since $f_2$ and $f_8$ are the only carriers, the power levels $C_2$ and $C_8$ are calculated according to step 515:

$$C_2 = \frac{P_{FS,DAC}}{\left(\sqrt{m_{12}} + \sqrt{m_{22}} + \ldots + \sqrt{m_{82}}\right)^2}$$

$$= \frac{P_{FS,DAC}}{\left(0 + 1 + 0 + \ldots + \sqrt{10^{-1}}\right)^2}$$

$$= \frac{P_{FS,DAC}}{1.732}$$

$$= .577$$

$$C_8 = \frac{P_{FS,DAC}}{\left(\sqrt{m_{18}} + \sqrt{m_{28}} + \ldots + \sqrt{m_{88}}\right)^2}$$

$$= \frac{P_{FS,DAC}}{\left(0 + \sqrt{10} + 0 + \ldots + 1\right)^2}$$

$$= \frac{P_{FS,DAC}}{17.32}$$

$$= .057$$

Referring now to FIG. 6, the gain of the Digital Power Control modules $DPC_2$ and $DPC_8$ are set such that the power levels of their output signals $C_2$ and $C_8$ are 0.577 mW and 0.057 mW, respectively.

The analog gain is calculated according to step 525 using the transmit power level and digital gain for the second carrier frequency $f_2$. Accordingly, $P_{2,out}$ and $C_2$ are converted from Watts to decibels, (i.e., $P_{2,out}=1$ Watt= 10*log1000=30 dBm, and $C_2=1/1.732$ milliWatt=−2.4 dBm). In accordance with equation (5), the analog gain $G_{ana}$ is equal to 32.4 dB, i.e., $G_{ana}=30-(-2.4)=32.4$ dB. Alternatively, the analog gain can be calculated using the eighth carrier frequency $f_g$. Accordingly, $P_{g,out}$ and $C_g$ are converted from Watts to decibels, (i.e., $P_{8,out}=0.1$ Watt= 10*log100=20 dBm, and $C_8=1/17.32$ milliWatt=−12.4 dBm). In accordance with equation (5), the analog gain $G_{ana}$ is equal to 32.4 dB, i.e., $G_{ana}=20-(-12.4)=32.4$ dB. Therefore, the Radio Control Unit 450 sets the gain of the analog power control module 460 in accordance with the analog gain calculated in accordance with equation (5).

Figure 7:
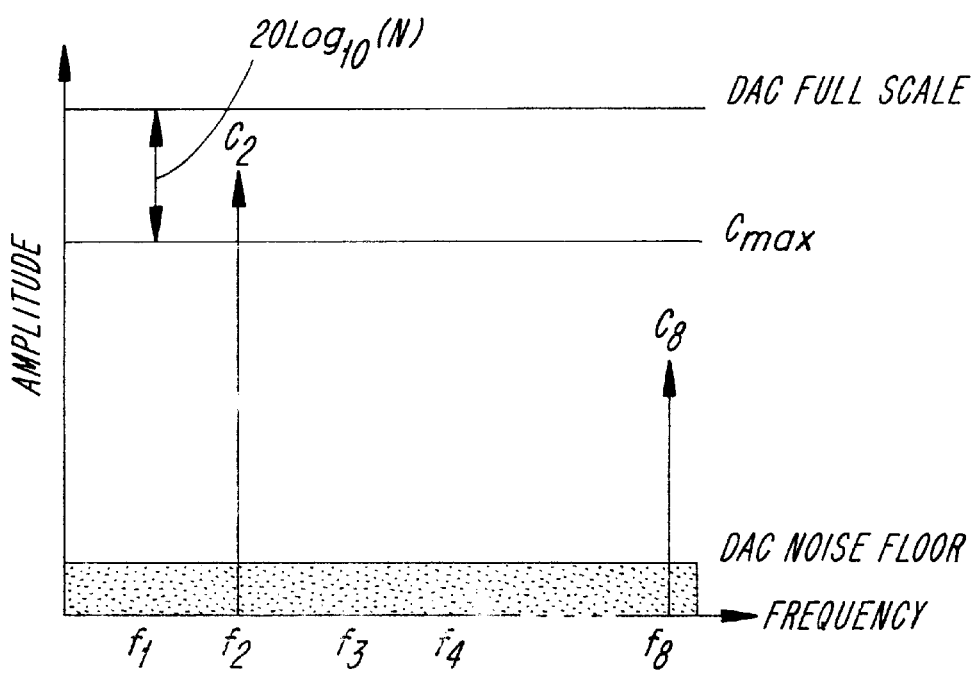
FIG. 7 illustrates a time slot where two carriers are active and one carrier's power level exceeds $C_{max}$.

FIG. 7 is a graph of the amplitude versus frequency of the two active carriers, $f_2$ and $f_8$, described in the exemplary embodiment above. As stated above, the full scale power output of the DAC is equal to 1 milliwatt, or 0 dBm. Since there are two active carriers, $C_{max}$ would be set at 6 dB, i.e., $20*\log_{10}(2)$, below the DAC full scale level. Further, as stated above, the power level of the second carrier is −2.4 dBm and the power of the eighth carrier is −12.4 dBm. Accordingly, using the multicarrier transmitter as described above, results in the power level of the second carrier being approximately 3.6 dB above the $C_{max}$ power level. In contrast, the prior multicarrier transmitters would limit the power levels of the carriers to $C_{max}$, which would result in a lower signal-to-noise ratio for the carriers.

Although the exemplary embodiments described above relate to a TDMA embodiment, one skilled in the art can see that the present invention is equally applicable in a CDMA embodiment. For instance, referring now to FIG. 4, the multipliers, $multi_1 \ldots multi_N$ will be used to multiply the baseband data streams by a corresponding spreading code. The signals can be combined by the summer and forwarded to the DAC 120. Similar to the TDMA embodiment described above, in order to maximize the signal-to-noise ratio of each individual carrier and the sum of the carriers, digital power control modules $DPC_1 \ldots DPC_N$ adjust the power of the baseband data streams so that the sum of the baseband data streams is equal to the full scale range of the DAC. Once the summed signal has been converted into analog, a scrambling code may (optionally) be applied to the summed signal and then forwarded to the analog power control module 460 to adjust the signal power to the correct level required for the receiving mobile stations.

The present invention has been described by way of exemplary embodiments to which the invention is not limited. Modifications and changes will occur to those skilled in the art without departing from the spirit and scope of the invention as defined in the appended claims.

What is claimed is:

1. In a multicarrier transmitter, a method for maximizing a signal-to-noise ratio of each of a plurality of individual carriers, the method comprising the steps of:
    modulating a plurality of baseband data streams;
    adjusting the power level of each of said plurality of modulated baseband data streams;
    upconverting, to a respective carrier frequency, each of said plurality of power modulated, baseband data streams to form the plurality of individual carriers;
    combining said plurality of individual carriers into a single data stream with a power level which is a function of the power levels associated with said plurality of individual carriers;
    converting, in a digital to analog converter, said single data steam into an analog waveform; and
    variably adjusting the power level of said analog waveform.

2. The method of claim 1, wherein the step of adjusting the power level of the plurality of modulated baseband data streams comprises the step of:
    individually setting a gain of said plurality of modulated baseband data streams so that the power level of said plurality of individual carriers is equal to a full scale range of a digital-to-analog converter.

3. The method of claim 1, wherein said step of variably adjusting the power level of said analog waveform comprises the step of:
    setting a gain for said analog waveform so that an absolute output power level of each of the carriers is equal to an amount of power required to provide a mobile station with an acceptable signal.

4. The method of claim 1, wherein said power level of the single data stream is equal to the square of the sum of the square root of each individual carrier.

5. A radiocommunication transmitter comprising:
    a digital power control module;
    a digital-to-analog converter;
    an analog power control module; and
    a radio control unit for adjusting the gain of said digital power control module and for adjusting the gain of said analog power control module, wherein the gain of said digital power control module is set such the output of said power control module is equal to a full scale range of said digital-to-analog converter.

6. A radiocommunication transmitter comprising:
    a digital power control module;
    a digital-to-analog converter;
    an analog power control module;
    a radio control unit for adjusting the gain of said digital power control module and for adjusting the gain of said analog power control module;
    a modulator for modulating a baseband data stream and providing said modulated data stream to said digital control module; and
    a multiplier for upconverting signals from said digital power control module to a corresponding carrier frequency and for providing said signals to said digital-to-analog converter.

7. A multicarrier transmitter comprising:
    a plurality of digital power control modules;
    a digital-to-analog converter; and
    a radio control unit for individually adjusting the gain of each of said plurality of digital power control modules;
    wherein the gain of each of said plurality of digital power control modules is set such that the square of the sum of the square root of power levels associated with the output of each of said power control modules is equal to a full scale range of said digital to analog converter.

8. The multicarrier transmitter of claim 7 further comprising:
    an analog power control module; and
    wherein a gain of said analog power control module is set such that power levels of individual carrier signals at an output of said analog power module are equal to a predetermined power level.

9. The multicarrier transmitter of claim 8, wherein said predetermined power level is a power level which a mobile station corresponding to one of said carrier signals receives a signal of acceptable quality.

10. The multicarrier transmitter of claim 7, further comprising:
    a plurality of modulators for modulating a plurality of baseband data streams and providing said modulated data streams to said plurality of digital control modules;
    a plurality of multipliers for upconverting signals from said digital power control modules to a plurality of corresponding carrier frequencies; and
    an adder for summing said plurality of upconverted signals and providing said summed signals to said digital-to-analog converter.

11. A multicarrier transmitter comprising:
    means for individually adjusting a power level of a plurality of modulated data streams;
    means for upconverting said modulated data streams to form a plurality of carrier signals;
    means for combining said plurality of carrier signals into a single data stream;
    means for converting said single data stream from a digital waveform into an analog waveform; and
    means for adjusting the power level of said analog waveform;

wherein said means for adjusting the power level of said analog waveform is controlled by a radio control unit.

12. In a multicarrier transmitter, a method for maximizing a signal-to-noise ratio of each individual carrier, the method comprising the steps of:

modulating a plurality of baseband data streams;

adjusting the power level of each of said plurality of modulated data streams;

upconverting, to a respective carrier frequency, each of said plurality of power adjusted data streams to form the plurality of carriers;

combining said plurality of carriers into a single data stream; and converting, in a digital-to-analog converter, said combined data steam into an analog waveform;

wherein a peak power level of said plurality of modulated data streams is adjusted so that the power level of said single data stream is equal to a full scale range of a digital-to-analog converter.

13. The method of claim 12, further comprising the step of:

variably adjusting the power level of said analog waveform.

14. The method of claim 13, wherein said step of variably adjusting the power level of said analog waveform comprises the step of:

setting a gain for said analog waveform so that an absolute output power level of each of the carriers is equal to an amount of power required to provide a mobile station with an acceptable signal.

15. In a multicarrier transmitter, a method for maximizing a signal-to-noise ratio of each of a plurality of individual carriers and of a sum of said plurality of individual carriers, the method comprising the steps of:

modulating a plurality of baseband data streams;

adjusting the power level of each of said plurality of modulated baseband data streams;

applying a respective spreading code on each of said plurality of power modulated, baseband data streams to form the plurality of individual carriers;

combining said plurality of individual carriers into a single data stream;

converting, in a digital to analog converter, said single data steam into an analog waveform; and variably adjusting the power level of said transmission signal.

16. The method of claim 15, wherein the step of adjusting the power level of the plurality of modulated baseband data streams comprises the step of:

individually setting a gain of said plurality of modulated baseband data streams so that the power level of said single data stream is equal to a full scale range of a digital-to-analog converter.

17. The method of claim 15, wherein said step of variably adjusting the power level of said analog waveform comprises the step of:

setting a gain for said analog waveform so that an absolute output power level of each of the carriers is equal to an amount of power required to provide a mobile station with an acceptable signal.

* * * * *